United States Patent [19]
Fujii et al.

[11] Patent Number: 4,660,190
[45] Date of Patent: Apr. 21, 1987

[54] OPTICAL FOCUS POSITION CONTROL IN OPTICAL DISC APPARATUS

[75] Inventors: Yoshikazu Fujii; Toshihisa Deguchi; Tetsuya Inui, all of Nara; Hideyoshi Yamaoka, Matsubara, all of Japan

[73] Assignee: Sharp Kabushiki Kaisha, Osaka, Japan

[21] Appl. No.: 529,849

[22] Filed: Sep. 6, 1983

[30] Foreign Application Priority Data

Jan. 25, 1983 [JP] Japan .................................. 58-11037
Apr. 18, 1983 [JP] Japan .................................. 58-68770
Apr. 18, 1983 [JP] Japan .................................. 58-68771
Apr. 19, 1983 [JP] Japan .................................. 58-69619

[51] Int. Cl.$^4$ ............................................. G11B 7/00
[52] U.S. Cl. ........................................ 369/44; 369/45; 369/13
[58] Field of Search ................... 369/13, 43, 44, 45, 369/46, 110; 360/59, 114; 358/342; 250/201 DF

[56] References Cited

U.S. PATENT DOCUMENTS

| 4,100,576 | 7/1978 | Ditthardt | 369/45 X |
| 4,302,830 | 11/1981 | Hamaoka et al. | 369/45 |
| 4,367,543 | 1/1983 | Araki et al. | 369/45 |
| 4,408,313 | 10/1983 | Musha | 369/45 |
| 4,437,177 | 3/1984 | Watabe et al. | 369/45 |
| 4,449,213 | 5/1984 | Noberimoto et al. | 369/45 |
| 4,451,863 | 5/1984 | Yanagida et al. | 360/114 |
| 4,462,096 | 7/1984 | Kusaka | 369/45 |
| 4,479,051 | 10/1984 | Musha | 350/247 |
| 4,481,613 | 11/1984 | Yokota | 369/45 |
| 4,482,986 | 11/1984 | Noda et al. | 369/44 |

FOREIGN PATENT DOCUMENTS

58-12145  1/1983  Japan .................................... 369/45

Primary Examiner—Robert L. Richardson
Attorney, Agent, or Firm—Birch, Stewart, Kolasch & Birch

[57] ABSTRACT

Disclosed below is a control device for positioning an optical focus in an optical disc apparatus that records, plays back, and erases any information by irradiating optical beams such as the laser beams onto a recording media composed of magnetic film, wherein the control device is characterized in that; it incorporates a focussing permanent magnet that makes up a closed magnetic circuit, a focussing yoke plate, a focussing yoke, and a focussing device coil installed so that it crosses a focussing magnetic space existing that exists between the focussing yoke plate and the focussing yoke so that the focussing magnetic space can be created in an area close to the recording media which is installed in the closed magnetic circuit. In addition, the optical focus position control device that executes both the tracking and focussing control operations for the optical disc apparatus also includes mechanism that drives the objective lens in the direction of dual axes, i.e., in the vertical (up-/down) and horizontal (left/right) directions.

19 Claims, 13 Drawing Figures

OPTICAL FOCUS POSITION CONTROL IN OPTICAL DISC APPARATUS

BACKGROUND OF THE INVENTION

The present invention relates to a control device for positioning an optical focus in of an optical disc apparatus that records, plays back, and erases a variety of information by irradiating optical beams, such as the laser beams, onto a recording media composed of magnetic film.

Conventionally, existing optical disc apparatuses easily cause the surface of an optical disc to vibrate during rotation, and as a result, recording tracks on the disc are displaced in the direction of the optical axis of the incident laser beams that irradiate the disc surface. Also, the disc is adversely affected by any deviation existing between the center position of the disc and the center of the motor shaft that drives the disc. Recording tracks of such a disc with this centering deviation are displaced in the direction of the disc radius (hereinafter called the radial direction). To prevent the recording tracks from being displaced from the incident laser beams a device is provided so that the position of the laser beam focus can be correctly adjusted within the optical head mechanism so that the incident laser beam spot correctly matches the recording tracks of a disc. Such a device is called a control device for positioning the optical focus in the following description.

Using any of the existing optical disc apparatus as such as one that only plays back information without containing any magnetic film recording media, or another that can record additional information, in order to precisely adjust the focus position of the incident laser beams (hereinafter called the focus controller) to compensation disc displacement in the direction of the optical axis of the incident laser beams, a device that varies the position of the objective lens of the incident laser beams by means of electromagnetism is well known. On the other hand, to precisely adjust the focus position of the incident laser beams (hereinafter called the tracking controller) to compensate for disc displacement in the radial direction, a variety of mechanism that can adjust the focus position of the incident laser beams via a rotary mirror that reflects the incident laser beams against any optimum direction have been introduced. A new proposal has been introduced quite recently, which provides a mechanism capable of jointly performing both the focus and tracking controls mentioned above, by varying the position of objective lens via the electromegnatic force. Basically, the mechanism comprises a coil that can be moved integrally with an objective lens and a stationary permanent magnet, thus causing the objective lens to be displaced by the current flowing through said coil.

If such an already known mechanism capable of jointly performing both the focus and tracking controls by varying the position of the objective lens via the electromagnetic force is actually applied to an optical disc apparatus, it will easily create problems as described below.

Since the proposed mechanism uses magnetism generated by a permanent magnet, a leakage magnetism or flux will be generated in portions peripheral to the disc. Nevertheless, since the disc uses the magnetic film for the recording media, if such a leakage magnetism adversely affects said megnatic film, the following problems will arise.

(1) When the laser beams are irradiated onto an optical magnetic disc they cause the disc temperature to rise, and simultaneously information is recorded on said disc via an external magnetism, however, if a leakage magnetism from said optical focus position control affects the disc, then the quality of the recorded information will be degraded significantly.

(2) When playing back the recorded information via the magnetic-optical effect by irradiating laser beams onto the optical magnetic disc, any leakage flux from said optical focus position control may adversely affect the disc, thus causing the recorded information to be easily erased.

In light of these potential disadvantages, if an optical disc apparatus is used, it is quite necessary to completely prevent even the slightest leakage flux from the optical focus position control from seriously affecting the optical disc. In addition, there are still further problems to solve. For example, one might use a mechanism incorporating an objective lens-mirror cylinder which is supported by rubber material whose one end is secured to a stationary holder, while said objective lens-mirror cylinder can be driven by electromagnetic force existing between the coil secured to said objective lens-mirror cylinder and the magnetic circuit secured to said stationary cylinder. Since said rubber-elastic material supports the objective lens-mirror cylinder, it cannot fully resist the tilting force of the objective lens-mirror cylinder, and as a result, an accidental force may be generated when the drive force generated by said electromagnetic force cannot be applied to the gravity center of the objective lens-mirror cylinder, thus causing said cylinder to eventually generate a rotary movement. This will cause the optical axis of the incident laser beams to tilt against the center axis of the objective lens. The result is that either off-axis astigmation or coma aberration will adversely affect the disc tracks that contain information, causing beams to poorly focus on them, and as a result, quality of the recorded information will be degraded significantly.

SUMMARY OF THE INVENTION

The present invention provides an improved mechanism for the control of the position of the optical focus by minimizing any adverse effect of the leakage magnetism against the optical disc.

A still further object of the present invention is to securely achieve a mechanism that stably drives the objective lens in dual directions, i.e., either in the vertical (up/down) or horizontal (left/right) direction without causing the objective lens to incline by using an optical focus position controller capable of controlling both the tracking and focussing of an optical disc apparatus, and yet, the present invention aims at achieving such a mechanical device featuring a significantly compact dimension.

DETAILED DESCRIPTION OF THE INVENTION

Figure 1:
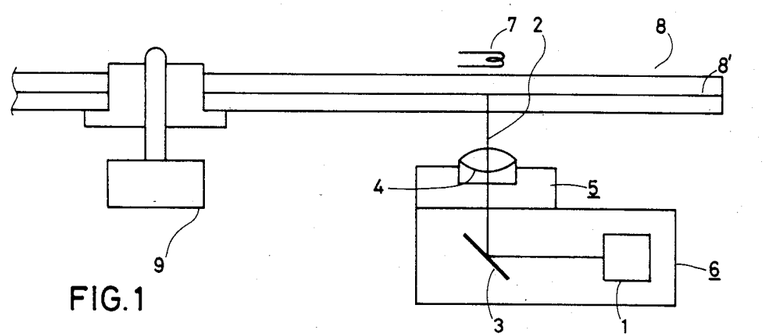
FIG. 1 shows a simplified block diagram of an optical disc apparatus as a preferred embodiment of the present invention.

FIG. 1 shows a simplified block diagram of an optical disc apparatus as a preferred embodiment of the present invention. In FIG. 1, symbol 1 denotes a laser beam source that emits laser beams 2. Symbol 3 denotes a mirror, and symbol 4 denotes an objective lens that causes the laser beams 2 to be focussed onto the recording media surface of a disc. Symbol 5 denotes a control device for positioning an optical focus that causes the optical focus position to accurately follow the tracks of the recording media of a disc by driving an objective lens 4 either in the vertical (up/down) or horizontal (left/right) direction. Symbol 6 denotes an optical head that contains all the optical devices mentioned above. Symbol 7 denotes a recording/erasing coil that provides the surface of the disc recording media with magnetism while either recording or erasing any information. Symbol 8 denotes an optical disc incorporating a disc recording media 8', and symbol 9 denotes a motor that drives said optical disc to rotate.

The focus control to be performed by the control device 5, i.e., a fine adjustment of the incident laser beam focus position against the disc displacement made in the direction of the incident laser beam axis can be achieved by causing the objective lens 4 to move in the direction of the thickness of the optical disc 8. On the other hand, the tracking control to be performed by the control device 5, i.e., a fine adjustment of the incidental laser beam focus position in dealing with the disc displacement in the radial direction can be performed by causing the objective lens 4 to move in the radial direction of the optical disc 8.

Figure 2:
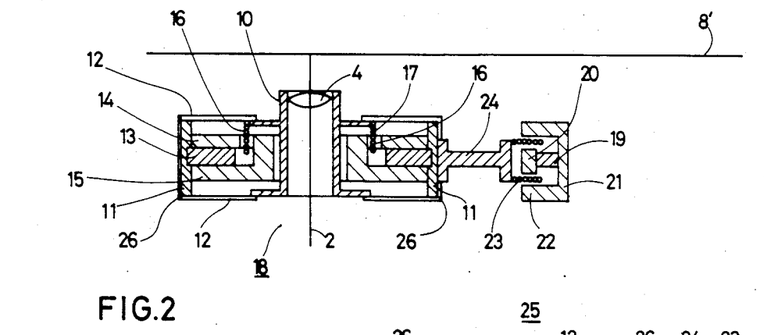
FIG. 2 shows a sectional view of a controller of position of an optical focus as a preferred embodiment of the present invention.

FIG. 2 shows a detailed sectional view of the control device as a preferred embodiment of the present invention. First, the focus controller is described below. Symbol 10 denotes a lens-mirror cylinder containing and supporting an objective lens 4, where said lens-mirror cylinder 10 is installed to a holder 11 so that it can be vertically moved by the elastic material 12 movable in the direction of the focus.

Symbol 13 denotes the focussing permanent magnet, while symbol 14 denotes the focussing yoke plate, and symbol 15 denotes the focussing yoke, and together they make up a closed magnetic circuit, while each is securely connected to the holder 11. Magnetic space 16 is provided between said focussing yoke plate 14 and focussing yoke 15, which is available for the focussing operation. Symbol 17 denotes the focus driving coil, which is installed to the lens-mirror cylinder across said magnetic space 16. If the focus control current is fed to said focus driving coil 17, magnetism will be generated in said coil 17, and as a result, due to a combined effect with the other magnetism generated by said focussing permanent magnet 13, the focus driving coil 17, together with the lens-mirror cylinder 10, and the objective lens 4, will displace themselves in the direction of the incident laser beam axis. These make up the focus controller 18. Structure of the tracking controller is described below.

Symbol 19 denotes a permanent magnet available for the tracking operation, while symbol 20 denotes a yoke plate and symbol 21 denotes a yoke available for the tracking operation, respectively. These make up a closed magnetic circuit. These units are securely connected to a holder (not illustrated) that fully supports the optical focus position control device.

Magnetic space 22 available for the tracking operation is provided between said yoke plate 20 and yoke 21.

Symbol 23 denotes a radial driving coil, which is securely connected across said magnetic space 22 to the radial drive coil holder 24. As shown in the drawing, said radial drive coil holder 24 is connected to the focus controller 18. Since the focus controller 18 can be moved by the elastic material (not illustrated) that is movable in the radial direction, if the tracking control current is fed to said radial drive coil 23, magnetism will be generated by said coil 23, and as a result, due to a combined effect with the other magnetism generated by the permanent magnet 19 that is used for the tracking operation, the focus controller 18 will displace its position in the radial direction. These make up the tracking controller 25.

The present invention provides a variety of means for effectively preventing the optical focus position control device comprising said focus controller 18 and tracking controller 25 from causing its leakage magnetism to adversely affect the recording media 8 of an optical disc. Such effective means are described below.

(1) Details of means related to the focus controller.

Figure 3A:
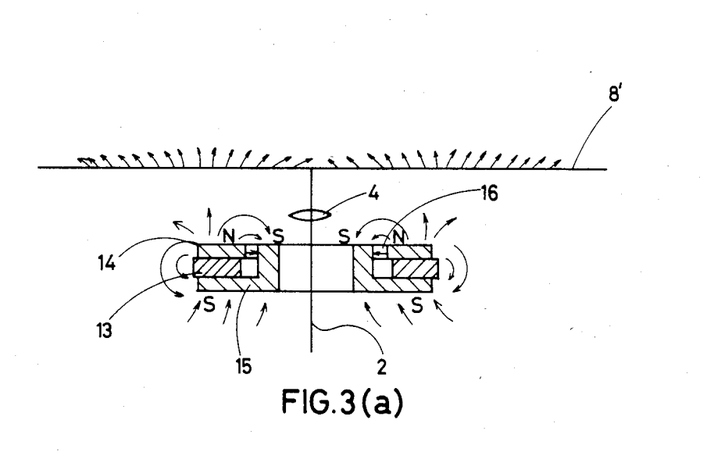
FIGS. 3(a) and 3(b) show sectional views of a focussing controller as a preferred embodiment of the present invention.
Figure 3B:
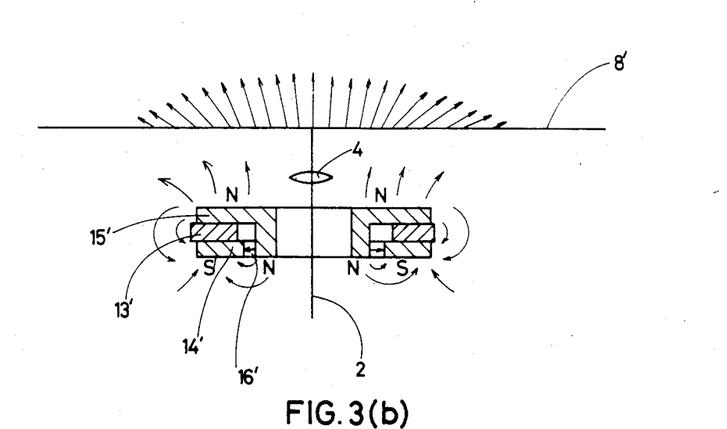

FIG. 3(a) shows a sectional view of a focus controller incorporating an improved means as a preferred embodiment of the present invention, whereas FIG. 3(b) shows a sectional view of another focus controller that does not incorporate any improved means. Symbols N and S respectively denote the north and south poles. As shown in FIG. 3(a), the focus controller incorporating an improved means related to the present invention provides magnetic space 16 available for the focussing operation in an area close to the optical disc. This construction minimizes leakage magnetism that otherwise adversely affects the recording media 8' of the optical disc. In other words, leakage magnetism will significantly affect the surface of the recording media 8' of the optical disc if said magnetic space 16 for the focussing operation is provided in an area remote from the optical disc as shown in FIG. 3(b). Length of each arrow in FIGS. 3(a) and 3(b) respectively denotes the intensity of the leakage magnetism at the position where the focussing operation just starts, while the direction of the leakage magnetism is shown in the arrowed direction.

(2) Details of means related to the tracking controller

Figure 4A:
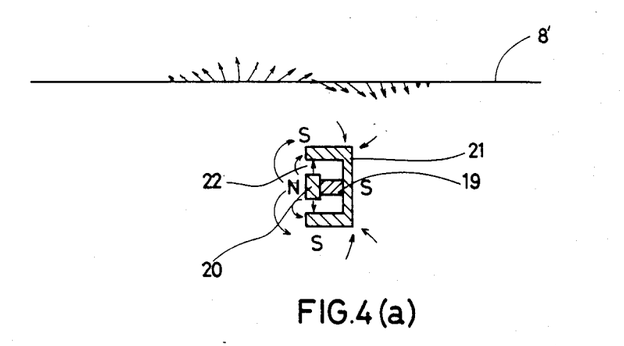
FIGS. 4(a) and 4(b) show sectional views of a tracking controller as a preferred embodiment of the present invention.
Figure 4B:
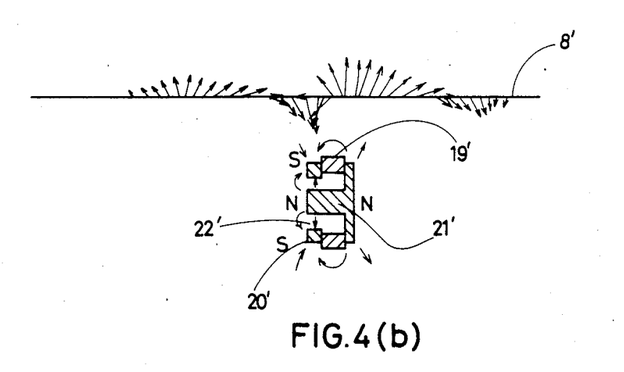

FIG. 4(a) shows a sectional view of the tracking controller incorporating an improved means as a preferred embodiment of the present invention, whereas FIG. 4(b) shows a sectional view of another tracking controller that does not incorporate any improved means. The tracking controller incorporating an improved means related to the present invention provides the permanent magnet 19 available for the tracking operation in the center position of the closed magnetic circuit. This construction minimizes leakage magnetism that otherwise adversely affects the recording media 8' of the optical disc. In other words, in such a construction where permanent magnets 19 available for the tracking operation are provided encircling the closed magnetic circuit, if the magnitude of magnetism that functions in the magnetic space 22' is of FIG. 4(b) designed to be equal to said magnetic space 22 of FIG. 4(a) available for the tracking operation, leakage magnetism will significantly affect the surface of the recording media 8' of the optical disc.

(3) Details of means related to both the focussing and tracking controllers

Figure 5A:
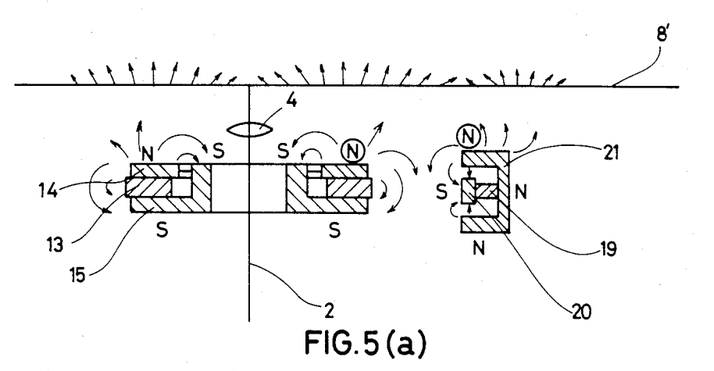
FIGS. 5(a) and 5(b) show sectional views of the combined focussing and tracking controller.
Figure 5B:
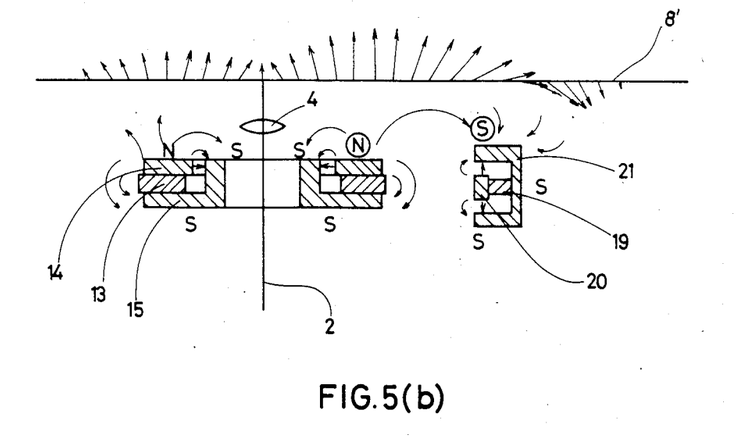

FIG. 5(a) shows sectional views of both the focus controller and the tracking controller incorporating improved means as preferred embodiments of the present invention, whereas FIG. 5(b) shows sectional views of both the focus controller and the tracking controller not incorporating any improved means related to the present invention. As shown in FIG. 5(a) both the focussing and tracking controllers with the improved means are set in positions being close to each other, while the magnetic poles of the yoke plate 14 that are available for the focussing operation, set in positions close to the optical disc, and the yoke 21 available for the tracking operation are of the same polarity, i.e., poles N and N face each other, as shown in FIG. 5(a). On the other hand, an example denoted in FIG. 5(b) shows that the magnetic poles of the focus controller and the tracking controller without incorporating any improved means related to the present invention are set in positions being close to each other, while the magnetic poles of the yoke plate 14 available for the focussing operation being set in positions close to the optical disc and the yoke 21 available for the tracking operation are of the opposite polarity, i.e., poles N and S face each other. In this case, magnitude of the leakage magnetism adversely affecting the surface of the recording media 8' of the optical disc doubles the other leakage magnetism affecting the device shown in FIG. 5(a).

In addition to the improved constructions described above, any adverse effect of the leakage magnetism against the surface of the recording media 8' of the optical disc can be further minimized by additionally providing said improved constructions with the following means including (a) a construction that provides a highly permeable magnetic substance such as permalloy in a position facing the optical disc of the optical focus position control device, (b) a construction that includes the entire optical focus position control device in said highly permeable magnetic substance, (c) a construction that includes a holder made of said highly permeable magnetic substance for supporting the entire optical focus position control device, and (d) a construction that includes both the focus controller and tracking controller within said highly permeable magnetic substance.

Figure 6:
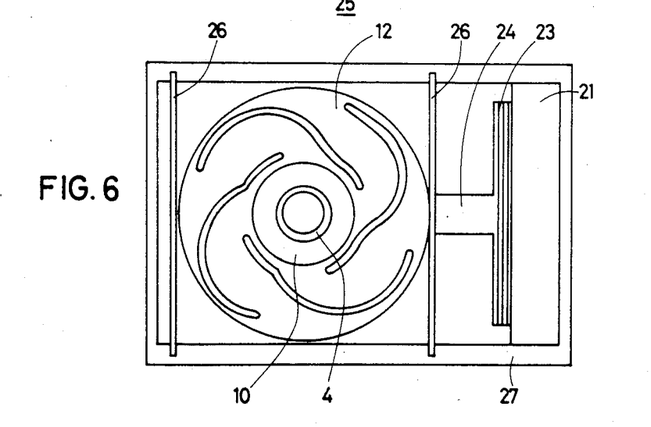
FIG. 6 shows a plan view of a control device for positioning of an optical focus as a preferred embodiment of the present invention.

FIG. 6 shows a plan view of the optical focus position control device shown in FIG. 2. As shown in the drawing, an objective lens mirror cylinder 10 is provided so that it can be moved only in the dual axes directions, i.e., either in the vertical (up/down) or horizontal (left/right) directions by being supported by the vertically workable elastic material 12 that moves in the focussing direction and by the horizontally workable elastic material 26 that moves in the radial direction. This construction prevents the objective lens from even the slightest incline. A focussing drive coil 17 is provided so that it can only move in the direction across the focussing magnetic space 16, while a radial drive coil 23 is provided so that it can only move in the direction across the tracking magnetic space 22. As a result, magnetic space available for both the focussing and tracking operations can be extremely narrow, and electromagnetic force can be used very effectively. This permits the permanent magnet size to be significantly minimized, and as a result, an extremely compact size of the optical focus control device can be achieved.

Next, the movement characteristis of both the controller and tracking controller of the objective lens 10 are described below.

(1) Movement characteristics of the focussing controller

As shown in FIGS. 2 and 6, the focussing controller is driven by an electromagnetic effect that interacts between the focussing closed magnetic circuit secured to the interim holder 11 and the focussing drive coil 17 secured to the objective lens mirror cylinder 10. Said interim holder 11 and the objective lens mirror cylinder 10 are connected to each other via the elastic material that is workable only in the vertical direction by moving in the direction of focussing, i.e., via a parallel spring 12 that can be moved in the direction of focussing.

Assuming that the weight of the movable part in the direction of focussing including the objective lens 4, objective lens mirror cylinder 10, and the driving coil 17 for focusing operation is Mf, whereas the vertical spring constant of the parallel spring 12 moving in the direction of focussing is Kf, the objective lens mirror cylinder 10 will be provided with a resonance frequency which is represented by a formula $$fF = \frac{1}{2\pi} \sqrt{\frac{KF}{MF}}$$

when performing vertical (up/down) movements. As soon as a driving force for the focussing operation is given by the interacting electromagnetic force, the movement phase delay in the displacement XF caused by the objective lens mirror 10 in the focussing direction can be represented to be 0° through 90° when $0 < f < fF$, where f (Hz) represents a frequency, whereas such a delay in the movement phase can be represented to be 90° through 180° when fF f, and it will be exactly at 180° when $fF < < f$. As a result, if the focussing target position is Yf, by advancing the phase of the signal representing the focussing drive force FF via the phase advancing compensation circuit, the movement phase delay in the displacement XF caused by the focus direction moving part can be adjusted to any desired level below 180°. This ensures a very stable focus control operation.

(2) Movement characteristics of the tracking controller

As shown in FIGS. 2 and 6, the tracking controller is driven by an electromagnetic effect that interacts between the closed magnetic circuit secured to the tracking closed magnetic circuit that is secured to the stationary holder 27 and the tracking dive coil 23 on the tracking drive coil holder 24 being secured to the interim holder 11. Said stationary holder 27 and the interim holder 11 are connected to each other via the elastic material that is workable only to the left and to the right by moving in the radial direction, i.e., via a parallel spring 26 that moves in the direction of the disc radius. Assuming that the weight of the focussing controller 18 is MT and the spring constant of the parallel spring 26 moving in the direction of the disc radius is KT, and then the objective lens mirror cylinder 10 will have a resonance frequency (hereinafter called the primary resonance frequency) fT which is represented by a formula $$fT = \frac{1}{2\pi} \sqrt{\frac{KT}{MT}}$$

when the focus controller 18 moves to the left and to the right. The interim holder 11 and the objective lens mirror cylinder 10 are connected to each other via the parallel spring 12 moving in the direction of focussing. while said parallel spring 12 moves to the left and to the right due to a certain amount of elasticity. Thus, assuming that the spring constant of the focus-direction parallel spring 12 is KF′, when it moves to the left and to the right and the objective lens mirror cylinder 10 also moves to the left and to the right, the spring constant will have a resonance frequency (hereinafter called the secondary resonance frequency) represented to be $$fT = \frac{1}{2\pi} \sqrt{\frac{KF}{MF}}.$$

As described above, whenever the objective lens mirror cylinder 10 moves to the left and to the right, both the primary and secondary resonance frequencies exist. Note that the spring constant KF′ of the parallel spring that moves in the focussing direction increases significantly when the spring moves to the left and to the right, which is denoted by KF′ >> KT. This means that the secondary resonance frequency f′T is significantly higher than the primary resonance frequency fT, the relationship of which is denoted by f′T > fT. When the tracking drive force FT is generated by the interacting electromagnetic force mentioned above with a frequency denoted by f, the movement phase delay caused by the displacement XT of the objective lens mirror cylinder 10 in the tracking direction is 0° through 90° when 0 < f < fT, or 90° through 270° when fT < f < f′T, or 270° through 360° when f′T < f.

When the tracking drive force FT is generated, the delay in the movement phase caused by the displacement XT of the objective lens mirror cylinder 10 moving to the tracking target position YT should remain below 180° throughout the frequency bands of the tracking control signal. As described earlier, even if the phase advancing compensation circuit is used to advance the phase of the tracking drive signal FT, since there is a certain limit for advancing the phase amount, the phase cannot be compensated for in order that it can exceed 180° significantly. To properly compensate for the phase delay, the second resonance frequency f′T should be set at an optimum level higher than the frequency band of the tracking control signal. Although frequency bands available for the tracking control signal are variable according to uses, generally, an optical disc apparatus uses 1 through 4 KHz of the frequency bands. As a result, it is clear that the secondary resonance frequency f′T should be set at a level above 8 KHz. Means for designing a construction that fully satisfies the above conditions are described below.

As described above, the secondary resonance frequency f′T can be determined by the spring constant KF′ of the parallel spring 12 moving in the focussing direction when it moves to the left and to the right and by the weight MF of the moving parts in the focussing direction, where the greater the spring constant KF′, the greater the secondary resonance frequency f′T. Nevertheless, since there is a certain limit in the means for decreasing the weight MF of the objective lens 4 and the lens mirror cylinder 10, the weight MF of the part moving in the focusing direction cannot be decreased significantly. (Normally, said weight MF is designed in a range from 0.5 to 10 grams.) The inventors performed trials for increasing the spring constant KF′ of the parallel spring 12 movable in the focussing direction during its movement to the left and to the right.

The spring constant KF′ was found to be $KF'/KF = (XY/YF)^2$ when the parallel spring 12 had a width XF and a thickness YF. As a result, it is clear that the spring constant KF′ in the horizontal direction (left/right) can be increased by expanding the width XF and decreasing the thickness YF of said parallel spring 12. In the light of the relationship denoted by $$\frac{f'T}{fT} = \sqrt{\frac{KF'}{KF}},$$

the secondary resonance frequency f′T can be obtained by an equation $$f'T = \frac{XF}{YF} \cdot fF.$$

It was eventually made clear that the parallel spring 12 moving in the horizontal direction (left/right) should be designed so that it can be provided with 20 through 50 micron meter of the thickness and an actual width that is 50 up to 100 times the reference width YF. If the parallel spring 12 movable in the focussing direction can be correctly designed in accordance with the findings described above, the delay in the movement phase caused by the displacement XT of the objective lens 4 against the tracking target position can be descreased below 180° within the frequency bands available for the tracking control signal. It is important that the phase advancing compensation circuit be used for correctly compensating for the movement phase.

According to the results of the trials performed by the inventors, very stable focussing and tracking controls were actually achieved by using a parallel spring 12 made from beryllium-copper alloy having 30 through 50 micron meters of the thickness. Nevertheless, since there are two kinds of the resonance frequencies; fF and f′T, if the damping characteristics in the directions of focussing and tracking control remain negligible, the resonance multiple factor in said resonance frequencies fF and fT will grow, thus causing interference vibration to easily occur during either the focussing or tracking control operation. Also, when a certain frequency above the resonance frequency level is fed, the phase in responding to the displacement of the movable parts will be extremely delayed to a point very close to 180° which will result in an extremely unstable optical focus position control operation. To prevent this and ensure satisfactory damping characteristics, the present invention effectively provides the following means.

(1) Structure of the primary means

Figure 7:
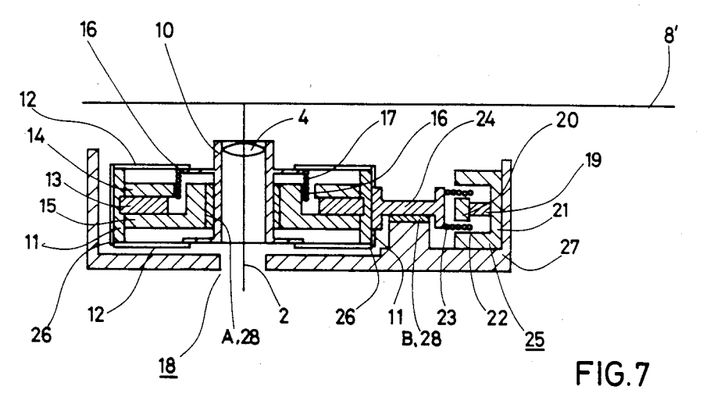
FIG. 7 shows a sectional view of a control device for positioning an optical focus incorporating the first means for properly dealing with the damping characteristics as a preferred embodiment of the present invention.

FIG. 7 shows a sectional view of the control device incorporating the primary damping means embodied by the present invention. As shown in the drawing, a damping material 28 is held in a space A between the objective lens mirror cylinder 10 and the focussing yoke 15, thus increasing the damping characteristics in the direction of the focus. The other damping material 28 is held in a space B between the tracking drive coil holder 24 and the stationary holder 27, thus increasing the damping characteristics in the direction of the tracking. To make up said damping material 28, viscose-elastic materials such as silicon rubber, butyl rubber, silicon-butyl rubber, and acrylic-ethylene rubber, foaming synthetic resin such as foamed polyurethane, and viscose fluid such as silicon grease, can be made available.

(2) Structure of the second means

Figure 8:
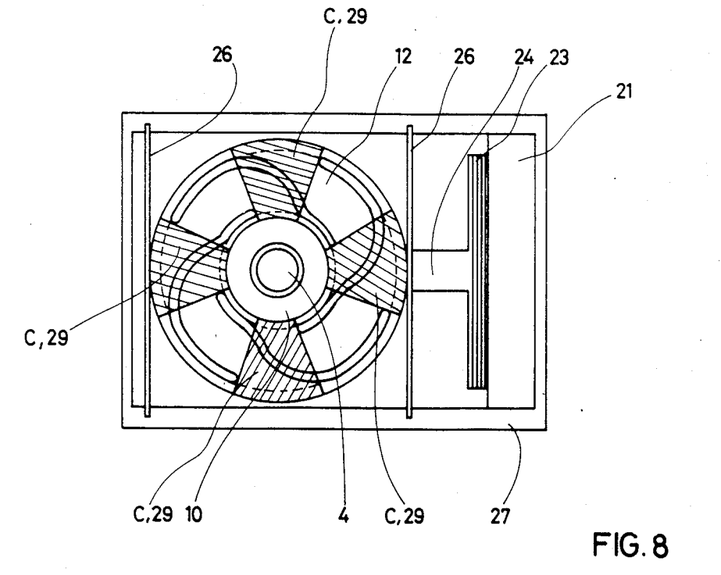
FIG. 8 shows a plane view of a control device for positioning an optical focus incorporating the second means for properly dealing with the damping characteristics related to the present invention.

FIG. 8 shows a plan view of the control device incorporating the second damping means embodied by the present invention. Parallel spring 12 that moves in the direction of focus has a structure that connects two concentric circles, where two flat sheet springs, each being connected to four arms at the edges, are provided in the upper and lower positions (See FIG. 2). Said parallel spring 12 moving in the direction of focus causes the objective lens mirror cylinder 10 to move only in the vertical direction relative to the position of the interim holder 11. Damping material 29 is bonded to the portion C of the surface of said parallel spring 12, where the largest amount of the relative displacement exists, thus resulting in greater damping characteristics in the direction of focus. To make up said damping material 29, viscose-elastic materials such as silicon-rubber, butyl rubber, silicon-butyl rubber, and acrylic-ethylene rubber, and foaming synthetic resin such as foamed polyurethane, can be made available.

(3) Structure of the third means

Figure 9:
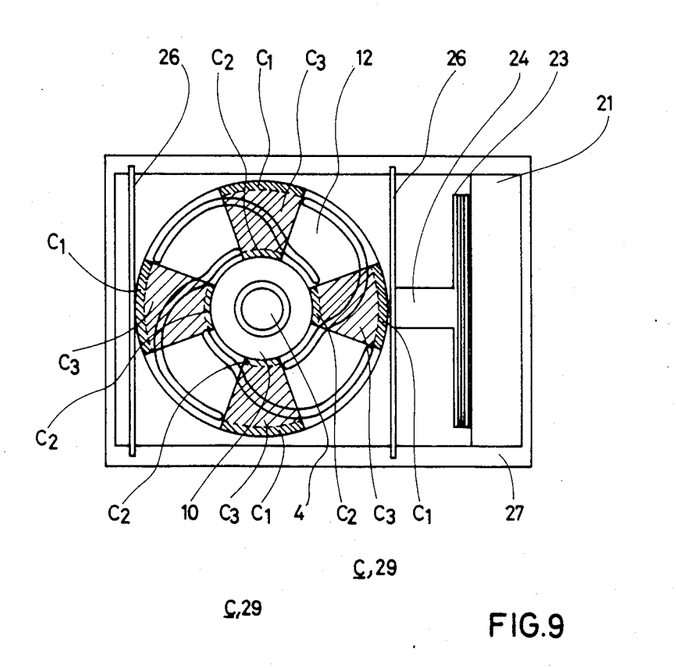
FIG. 9 also shows a plane view of a control device for positioning an optical focus incorporating the third means for properly dealing with the damping characteristics related to the present invention, and FIG. 10 also shows a plane view of a control device for positioning an optical focus incorporating the fourth means for properly dealing with the damping characteristics related to the present invention.

FIG. 9 shows a plan view of the control device incorporating the third damping means embodied by the present invention. Said damping material 29 is bonded to the portion C of the surface of the parallel spring 12, where the largest amount of the relative displacement exists. Said damping material 29 is connected to the parallel spring 12 via the edges C1 and C2. Viscose fluid such as silicon grease is charged in the portion C3 located between the edges C1 and C2, thus increasing the damping characteristics in the direction of focus.

(4) Structure of the fourth means

Figure 10:
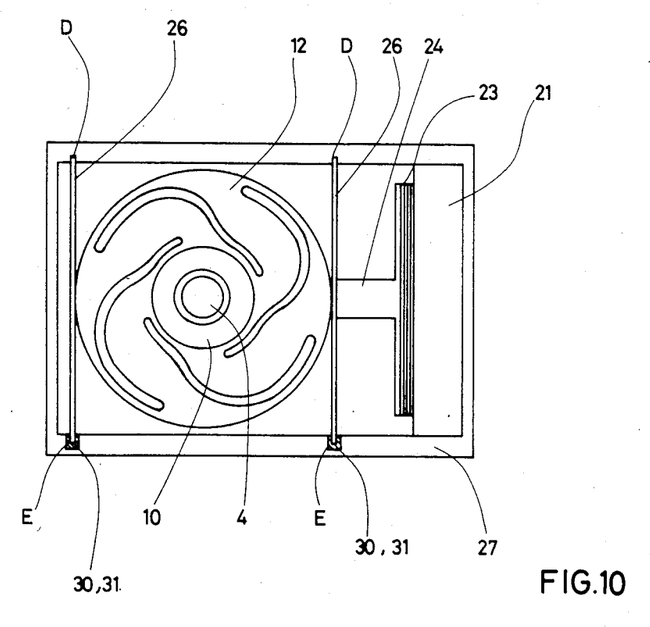

FIG. 10 shows a plan view of the control device incorporating the fourth damping means embodied by the present invention. The parallel spring 26 moving in the tracking direction is secured to the interim holder 11 (See FIG. 2) in the center position, while said spring 26 is also secured to the stationary holder 27 in both ends. First, one end D is secured to the stationary holder 27, and then the other end E is inserted into a slit 30 of the stationary holder 27, and finally viscose fluid 31 such as silicon grease is charged into said slit 30 to complete the installation of said parallel spring 26 that moves in the tracking direction.

In addition to these means described above, there are a variety of useful means for effectively making up either the focus-direction or tracking-direction movable parallel springs by using vibration-proof alloy such as manganese-copper alloy, ferro-aluminum alloy, nickel-titanium alloy, magnesium alloy, etc. It is also useful to make up said springs by coating latexed acrylic-ethylene rubber over both surfaces of either the focus-direction or tracking direction moving parallel spring. (Note that, if a sheet rubber is bonded to a metal spring by any adhesive agent such as primer, it will disadvantageously cause the spring to become stiff and the spring constant to increase.)

A wide variety of useful means for effectively increasing the damping characteristics have been described above, however, it will be quite useful if such effective means as described above are mutually combined so that the damping characteristics can be improved furthermore.

The present invention thus described in reference to the annexed drawings will obviously be suggestive of any derivation or modification from the spirit and scope described above by those skilled in the arts. It should be understood, however, that the present invention is not limitative within the spirit and scope described above, but is intended to solely include all of such derivations and/or modifications within the spirit and scope of the following claims.

What is claimed is:

1. An optical focus and positioning control device for controlling the optical focus and position of an optical beam such as a laser beam in an optical disc apparatus, the optical focus position control device comprising:
   an objective lens;
   lens support means for supporting said objective lens;
   a stationary holder;
   focus control means for shifting said lens support means in an axial direction along the optical axis of said optical beam, said focus control means including,
      a movable intermediate holder,
      focus parallel spring means for connecting said lens support means to said intermediate holder in a manner to allow said lens support means to move with respect to said intermediate holder in the axial direction of the optical disc, and
      electromagnetic focus drive means, having a closed magnetic circuit mounted for movement with said intermediate holder, for shifting said lens support means in said axial direction within said intermediate holder, said closed magnetic circuit minimizing flux leakage therefrom; and
   tracking control means for shifting said focus control means in the radial direction of the optical disc, said focus control means including,
      tracking parallel spring means for connecting said intermediate holder to said stationary holder in a manner to allow said intermediate holder to move with respect to said stationary holder in said radial direction, and
      electromagnetic tracking drive means for shifting said intermediate holder in said radial direction within said stationary holder, said electromagnetic tracking drive means including a close magnetic circuit to minimize flux leakage therefrom.

2. The optical focus position control device of claim 1, said electromagnetic tracking drive means comprising:
- a tracking permanent magnet creating said closed magnetic circuit;
- a tracking yoke plate supporting said tracking permanent magnet;
- a tracking yoke mounted on said stationary holder and supplying said tracking yoke plate;
- a tracking magnetic space formed between said tracking yoke plate and said tracking yoke; and
- a radial drive coil disposed in said tracking magnetic space so as to cross said tracking magnetic space.

3. The optical focus position control device of claim 1, said electromagnetic focus drive means comprising:
- a focusing permanent magnet creating said closed magnetic circuit;
- a focusing yoke plate supporting said focusing permanent magnet;
- a focusing yoke mounted on said intermediate holder and supporting said focusing yoke plate;
- a focusing magnetic space formed between said focusing yoke plate and said focusing yoke; and
- a focusing drive coil disposed in said focusing magnetic space so as to cross said focusing magnetic space.

4. The optical focus position control device of claim 3, wherein said focusing magnetic space is located close to an optical disc when installed in said optical disc apparatus.

5. The optical focus and positioning control device of claim 6 further comprising:
- a first damping element composed of a viscous elastic material disposed between and in contact with said lens support means and said focusing yoke; and
- a second damping element composed of a viscous elastic material disposed between and in contact with said tracking parallel spring means and said stationary holder.

6. The optical focus and positioning control device of claim 1 further comprising a focus spring damping element composed of a viscous elastic material, disposed on a surface of said focusing parallel spring means that causes greater damping characteristics in the direction of focus.

7. The optical focus and positioning control device of claim 1 wherein one end of said tracking parallel spring means is connected to one side of said stationary holder and another end of said tracking parallel spring means is secured to another side of said stationary holder with a tracking spring damping element composed of a viscous material being disposed at each of said connections between said stationary holder and said tracking parallel spring means.

8. The optical focus and positioning control device of claim 1 further comprising:
- a first damping element, composed of a viscous elastic material disposed between and in contact with said lens support means and said focusing yoke;
- a second damping element, composed of a viscous elastic material disposed between and in contact with said tracking parallel spring means and said stationary holder;
- a third damping element, composed of a viscous elastic material, disposed on a surface of said focusing parallel spring means which enhances the damping characteristics of the optical focus position control device in the direction of focus; and
- a pair of tracking damping elements, one of said pair of elements disposed between one end of said tracking parallel spring means and one side of said stationary holder and the other of said pair being disposed between a second end of said tracking parallel spring means and a second side of said stationary holder, each of said pair of tracking damping elements being composed of a viscous material.

9. The optical focus and positioning control device of claim 1 wherein said focus parallel spring means comprises a spring, including,
- an outer circular collar mounted on said moveable intermediate holder,
- an inner circular collar mounted on said lens support means, and
- a plurality of spirally shaped spring petals connecting said outer circular collar to said inner circular collar.

10. The optical focus and positioning control device of claim 9 wherein each said spring petal has a width and a thickness which are related such that $$(KF^1/KF) = ((XY/YF))^2$$

where
- $KF^1$ is the spring constant of said spring petal in the radial direction,
- $KF$ is the spring constant of said spring petal in the axial direction,
- $XY$ is the width of said spring petal, and
- $YF$ is the thickness of said spring petal.

11. The optical focus and positioning control device of claim 10 wherein said thickness $YF$ of said spring petal is from 20 to 50 micron meters.

12. The optical focus and positioning control device of claim 11 wherein said width $XF$ is 50 to 100 times the value of said thickness $YF$.

13. The optical focus and positioning control device of claim 9 wherein said parallel spring is constituted from a beryllium-copper alloy.

14. An optical focus and positioning control device for controlling the optical focus and position of an optical beam such as a laser beam in an optical disc apparatus, the optical focus position control device comprising:
- an objective lens;
- lens support means for supporting said objective lens;
- a stationary holder;
- focus control means for shifting said lens support means in the axial direction along the optical axis of said optical beam, said focus control means including,
  - a movable intermediate holder,
  - focus parallel spring means for connecting said lens support means to said intermediate holder in a manner to allow said lens support means to move with respect to said intermediate holder in the axial direction of the optical disc, and
  - electromagnetic focus drive means, having a closed magnetic circuit mounted for movement with said intermediate holder, for shifting said lens support means in said axial direction within said intermediate holder, said closed magnetic circuit minimizing flux leakage therefrom, said electromagnetic tracking drive means including, a focus permanent magnet creating said closed magnetic circuit, a focus yoke plate supporting said tracking permanent magnet, a focus yoke mounted on said intermediate holder and supplying said tracking yoke plate, a focus magnetic space formed between said tracking yoke plate and said tracking yoke, and an axial drive coil disposed in said tracking magnetic space so as to cross said tracking magnetic space; and tracking control means for shifting said focus control means in the radial direction of the optical disc, said tracking control means including, tracking parallel spring means for connecting said intermediate holder to said stationary holder in a manner to allow said intermediate holder to move with respect to said stationary holder in said optical axis direction, and electromagnetic tracking drive means for shifting said intermediate holder in said radial direction within said stationary holder, said electromagnetic focus drive means including a closed magnetic circuit to minimize flux leakage therefrom, said electromagnetic focus drive means including, a tracking permanent magnet creating said closed magnetic circuit;

a tracking yoke plate supporting said focusing permanent magnet, a tracking yoke mounted on said stationary holder and supporting said focusing yoke plate, a tracking magnetic space formed between said focusing yoke plate and said focusing yoke, and a tracking drive coil disposed in said focusing magnetic space so as to cross said focusing magnetic space.

15. The optical focus and positioning control device of claim 14 wherein said tracking permanent magnet has a magnetic polarity at a side of said tracking permanent magnet that is adjacent to said focusing permanent magnet which is the same polarity as the magnetic polarity of a side of said focusing permanent magnet which is adjacent to said side of tracking permanent magnet.

16. The optical focus and positioning control device of claim 14 wherein said tracking parallel spring means includes a first parallel spring composed of a vibration proof alloy and wherein said focusing parallel spring means includes a second parallel spring composed of a vibration-proof alloy.

17. The optical focus and positioning control device of claim 14 wherein said focus control means connects said objective lens support to said intermediate holder via a first parallel spring and said focus control means is connected to said stationary holder via a second parallel spring.

18. The optical focus and positioning control device of claim 17 wherein an elastic material is used to bind said first and second parallel springs to improve damping characteristics.

19. The optical focus and positioning control device of claim 18 wherein said elastic material is acrylicethylene rubber.

* * * * *